United States Patent [19]
Miller

[11] 3,841,267
[45] Oct. 15, 1974

[54] AQUARIUM ASSEMBLY

[75] Inventor: Jack Vernon Miller, Marietta, Ga.

[73] Assignee: M & L Aquatics

[22] Filed: Sept. 28, 1971

[21] Appl. No.: 184,358

[52] U.S. Cl............................. 119/5, 240/2 LC
[51] Int. Cl............................................ A01k 64/00
[58] Field of Search ....... 119/5; 160/229 R; 16/150, 16/DIG. 13; 240/2 LC

[56] References Cited
UNITED STATES PATENTS

| | | | |
|---|---|---|---|
| 1,986,018 | 1/1935 | Schoepfer | 119/5 |
| 2,081,023 | 5/1937 | Teach | 119/5 X |
| 2,394,870 | 2/1946 | Orlin | 160/229 R |
| 2,776,642 | 1/1957 | Sepersky | 119/5 |
| 2,792,811 | 5/1957 | DiChiaro | 119/5 |
| 3,152,574 | 10/1964 | Stout | 119/5 |
| 3,167,051 | 1/1965 | Hovlid | 119/5 |
| 3,515,097 | 6/1970 | Sherman | 119/5 |
| 3,676,665 | 7/1972 | Louis | 240/2 LC X |
| 3,677,433 | 7/1972 | Collins | 119/5 X |

FOREIGN PATENTS OR APPLICATIONS 1,185,420   3/1970   Great Britain.......................... 119/5

*Primary Examiner*—Hugh R. Chamblee
*Attorney, Agent, or Firm*—Newton, Hopkins & Ormsby

[57] ABSTRACT

An aquarium assembly capable of containing predetermined amounts of water for sustaining aquatic life. The aquarium assembly includes a sectionalized frame construction having an integrally formed rectangular base portion and an integrally formed rectangular top portion. The base portion and top portion are supported in parallel vertically spaced relation by four corner struts. The four corner struts are angular shaped in cross section and include side edges which converge upwardly from the base portion. Each of the strut members includes a number of longitudinally projecting locking elements which are adapted to be fitted within complementary sockets formed in the base and top portion for maintaining the sectionalized frame assembly in an assembled relationship. The aquarium tank is constructed of transparent glass or plastic material with the glass panels being joined together and sealed with a silicon rubber base to prevent leakage. The aquarium assembly includes a removable top constructed of a plurality of independently movable sections capable of being moved to an open position to permit access to the interior of the aquarium tank. A light assembly is supported on the aquarium top frame element and is detailed in construction and supported relative to the aquarium top to permit translating movement of the light assembly relative to the aquarium tank for varying the light effects produced by the light assembly.

5 Claims, 9 Drawing Figures

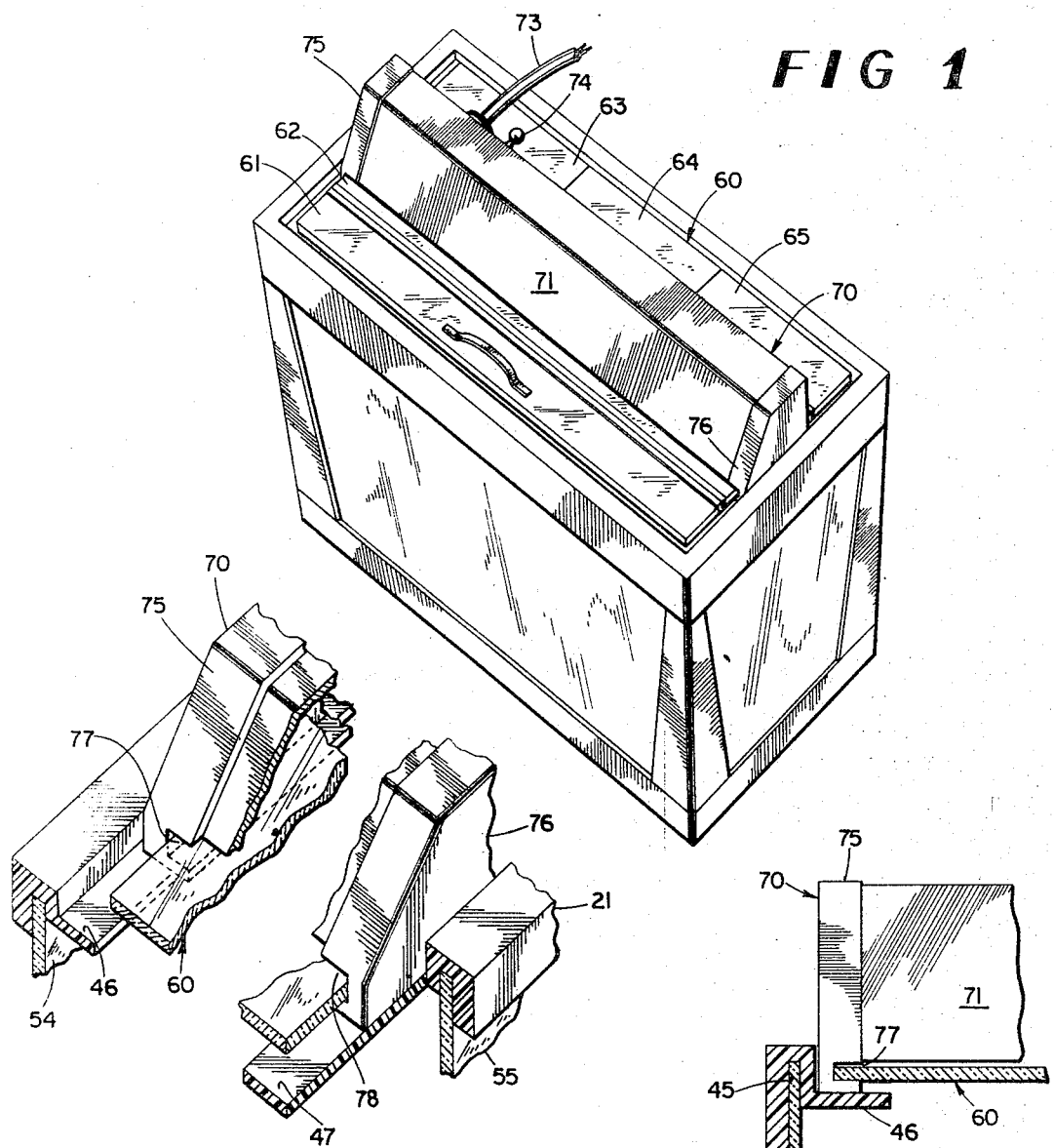

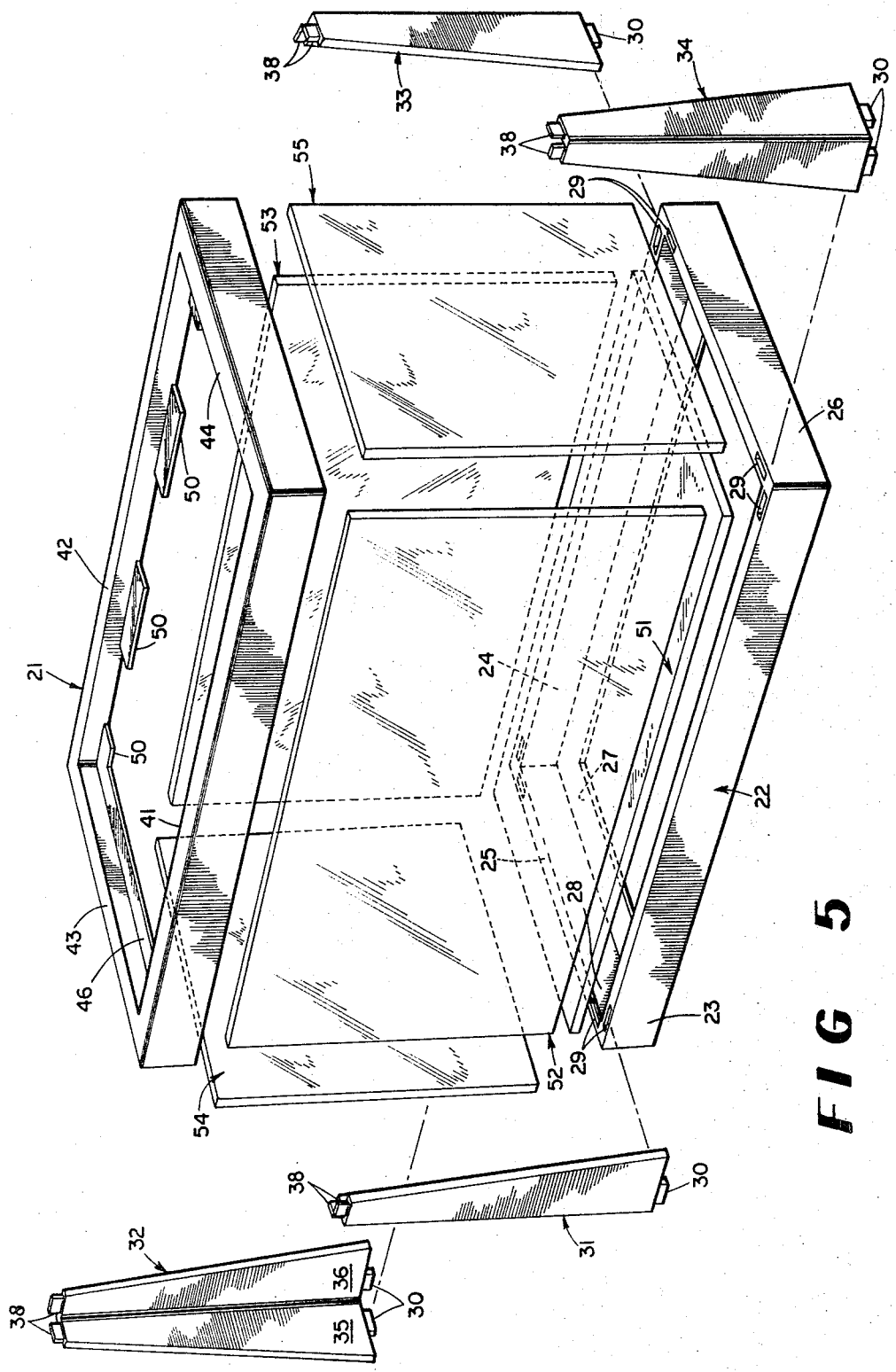

AQUARIUM ASSEMBLY

BACKGROUND OF THE INVENTION

This invention relates to aquariums capable of supporting aquatic life and is more particularly concerned with an aquarium tank assembly in which light means is supported over the aquarium for eliminating substances within the tank.

A number of aquarium constructions have been provided for supporting and maintaining aquatic life. Some of these prior aquarium constructions have been provided with illuminating means mounted in a fixed position on the aquarium top. Thus, the lighting effect could not be altered by movement of the light. Such prior art devices usually include a lamp which must be removed in order to permit access to the interior of the tank, either in front of or behind, the light housing.

Another problem with certain of the prior art aquarium tank assemblies is the complexity of construction of the framework construction. These prior art aquarium tank assemblies include a number of frame elements which are difficult to connect together and which fail to provide rigid supporting characteristics for maintaining the aquarium sides and bottom in hermetically sealed relationship.

SUMMARY OF THE INVENTION

The above disadvantages of the prior art have been overcome by the present invention which basically includes a tank in which the frame is constructed of plastic material including an upper perimeter frame and a lower perimeter frame which are complementary to each other and which are spaced apart by four corner struts, the corner struts being provided with upwardly and downwardly extending projections which are received within complementary sockets formed in the upper and lower perimeter frame elements.

An important feature of the present invention includes the interconnection of the four corner struts with the upper and lower perimeter frame elements, in such a manner as to prevent lateral movement of the frame elements with respect to each other, and enables the insertion of panels of plastic or glass transparent material to form the sides of the aquarium as well as providing a recess for receiving the top and bottom of the aquarium tank.

A basic feature of the aquarium tank assembly of the present invention includes a light housing which is carried by the top perimeter frame element of the aquarium so that it may be horizontally adjusted over the aquarium tank to alter the lighting effects produced within the tank.

The aquarium top is constructed to include a plurality of access lids, a front access lid which is hingedly secured to a central portion of the aquarium top and a plurality of rear access lids which individually hinged to the back edge of the top central portion.

It is therefore a primary object of the present invention to provide an aquarium assembly in which tank eliminating means may be adjusted to provide different lighting effects.

Another object of the present invention is to provide an aquarium assembly which is simple in construction and assembly, economical to manufacture, and reliable in operation.

A further object of the present invention is to provide an aquarium assembly which can be assembled without the use of special tools and which may be readily and easily designed for mass production.

A still further object of the present invention is to provide an aquarium tank assembly wherein access to preselected portions of the tank assembly is readily available through a number of individually adjustable access lids located on the aquarium top.

Still other objects and advantages of the details of construction will become apparent from the following description of the illustrative embodiments of the aquarium tank assembly embodying the principles of the present invention, with reference to the attached drawing wherein like reference numerals have been used to refer to like parts throughout the several figures, and wherein:

BRIEF DESCRIPTION OF THE DRAWINGS

FIG. 1 is a perspective view of an aquarium tank assembly embodying the principles of the present invention;

FIG. 2 is an enlarged fragmentary perspective view of the aquarium top portion, with certain parts omitted and certain parts broken away and shown in section for purpose of clarity;

FIG. 3 is a vertical sectional view taken along line 3—3 of FIG. 1;

FIG. 4 is a vertical sectional view taken along line 4—4 of FIG. 3;

FIG. 5 is an exploded perspective view of the component parts of the aquarium tank construction shown in FIG. 1;

DESCRIPTION OF THE ILLUSTRATIVE EMBODIMENTS

Figure 6:
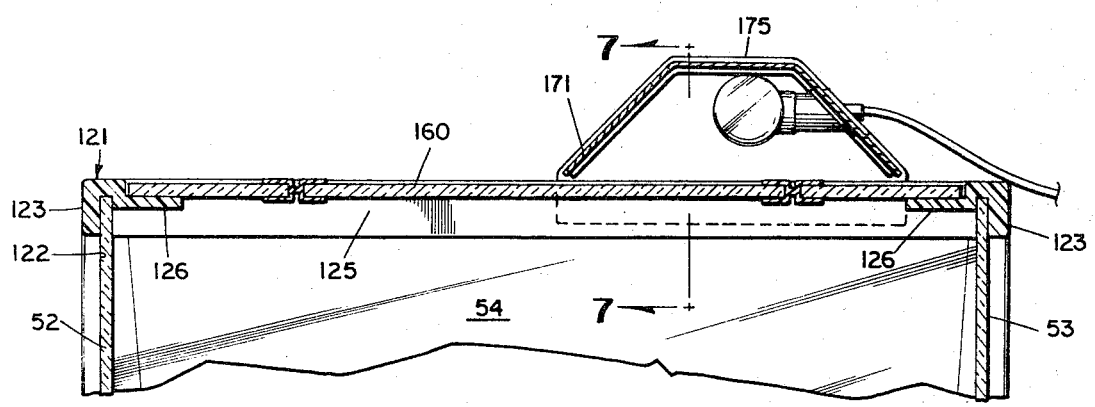
FIG. 6 is a vertical sectional view similar to FIG. 4 showing a modification of the top perimeter support element light housing.

Referring now to the drawings, the present invention will be described with reference to an aquarium tank assembly shown and generally represented by the reference numeral 10. The aquarium tank assembly will be described with reference to an aquarium frame and tank construction 20 and an aquarium illuminating means 70.

The function of the aquarium frame means 20 is to provide a number of easily assembled component frame elements which will provide a rigid supporting characteristic for maintaining the aquarium bottom and side in assembled, heremetically sealed relationship.

The function of the aquarium illuminating means 70 is to provide means for producing lighting effects within the aquarium tank.

As shown in FIG. 5, the aquarium frame construction 20 includes an upper rectangular perimeter frame 21 and a lower complementary perimeter frame 22. The two frames 21, 22 are constructed of integrally formed plastic material, such as polystyrene. The lower perimeter frame 22 includes a pair of parallel arranged side frame elements 23, 24 and a pair of parallel arranged end frame elements 25, 26. The frame elements 23–26 are integrally formed to provide a rectangular base frame. In cross section, the frame sides and ends are identical, each being of angular construction to provide an inwardly directed horizontal supporting ledge 27 and a vertically directed retaining flange 28.

As shown in FIG. 5, a number of receiving sockets 29 are formed in the upper surface of the base frame 22 adjacent each of the corners. The receiving sockets 29 are detailed for receiving complementary downwardly extending projections 30 provided on four corner struts 31, 32, 33 and 34. Each of the four corner struts 31–34 are identical in construction having an angular cross section detailed to present a pair of inwardly directed retaining surfaces 35, 36. Each of the four corner struts retaining surfaces 35, 36 including edge portions which converge upwardly, whereby the four corner struts will be provided with a substantially wide base supporting area and a narrow top supporting area. The four corner struts 31–34 are provided with a number of upwardly extending projections 38. The upwardly extending projections 38 are detailed to be received within complementary downwardly extending sockets (not shown) provided adjacent the four corners of the upper perimeter frame element 21.

As shown in FIG. 5, the upper perimeter frame element 21 is constructed of a pair of parallel arranged side frame elements 41, 42 and a pair of end frame elements 43, 44. The frame elements 41–44 are integrally formed to provide the rectangular upper perimeter frame 21. In cross section, as shown in FIGS. 2 and 4, each of the frame elements 41–44 are provided with a downwardly directed channel 45. Channel 45 is detailed in dimensions for receiving upper edge portions of the tank sides and end walls, as will be described in more detail hereinbelow. Each of the end frame elements 43, 44 are provided with an inwardly directed supporting ledge 46, 47. Ledges 46, 47, extend throughout the length of the end frame elements 43, 44. The side frame element 41 is provided with a similar supporting ledge 48 which extends throughout the length of frame element 41. As shown in FIG. 5, the side frame element 42 is provided with a number of spaced inwardly directed supporting ledges 50. The supporting ledges 46–50 will provide a coplanar horizontal supporting surface for supporting a transparent top member 60 as will be described in more detail hereinbelow. The aquarium tank is constructed to include a plastic or transparent glass bottom 51 which is adapted to be supported by the horizontal supporting flanges 27 provided on the base perimeter frame element 21. The aquarium tank includes a pair of transparent or plastic side panels 52, 53 and a pair of end panels 54, 55. The aquarium panels 52–55 are supported on the upper edge of the tank bottom 51 and are retained inside the vertical retaining flange 28 of the base perimeter frame element 21 and are retained inside the retaining surfaces 35, 36 of the four corner struts 31–34.

The upper edges of panels 52–55 are received within the rectangular channel 45 formed in the upper perimeter frame element 21, as shown in FIGS. 2–4. A silicone rubber compound is provided at the junction of each of the bottom, side and end panels to provide effective seal means to prevent leakage from the tank.

As shown in FIGS. 1–3, the aquarium top 60 includes a first access lid portion 61, a central cover portion 62 and a number of access lid portions 63, 64 and 65. The front access lid 61 is connected to the central cover portion 62 by a plastic hinge element 66. The plastic hinge element 66 will permit the access lid 61 to be moved from a horizontally oriented covered position to an open access position, as shown in dotted lines of FIG. 3. The access lids 63–65 are connected to the central cover portion 62 by similar plastic hinge means 67. The plastic hinge means 67 will permit the access lids 63–65 to be individually adjusted from an aquarium closed position to an aquarium access postion, as shown in dotted lines of FIG. 3.

As shown in FIGS. 1–4, the aquarium top 60 is supported on the ledges 46–50 provided on the upper perimeter frame element 21, whereby the cover 60 can be easily added to or removed from the aquarium tank assembly 10.

As shown in FIGS. 1–4, the aquarium tank assembly 10 includes illuminating means generally represented by the reference numeral 70. The illuminating means 70 includes an elongated housing 71. Housing 71 includes a downwardly opened cavity which is detailed for supporting light means 72. The light means 72 is provided within input power through a connecting cord means 73 and is controlled in on and off illuminating positions by a conventional switch means 74. The inside surface of housing 71 is detailed to provide a reflector surface for directing light produced by the light means 72 downwardly into the aquarium tank 10. The light housing 71 includes a pair of end wall members 75, 76. The housing 71 and end wall members 75, 76 are detailed in dimensions whereby the end wall members are slidably supported on the inwardly directed ledges 46, 47 provided on the upper perimeter frame end members 43, 44, respectively. The end walls 75, 76 are supported for translating movement relative to the ledges 46, 47 whereby the illuminating means 70 can be adjusted back and forth over the aquarium tank 10 for varying the lighting effects produced within the tank.

As shown in FIGS. 2–4, the end wall members 75, 76 include inwardly directed opposed notches 77, 78 respectively. Notches 77, 78 are detailed in dimension for receiving the lateral edges of the aquarium top cover 60, as shown in FIGS. 2–4. The notches 77, 78 will permit slidable adjustment of the illuminating means 70 relative to the aquarium top. In adjusting movement of the illuminating means 70 the end frame members 75, 76 are adjusted back and forth along the ledges 46, 47. During sliding movement of the end frame members 75, 76 the aquarium cover lateral edges will be allowed to be displaced through the end member opposed channel members 77, 78. The above described assembled relationship of the aquarium top 60 and illuminating means 70 will permit selective adjustment of the illuminating means relative to the top, whereby the lighting effects can be varied with the aquarium tank.

As shown in FIGS. 1–4, the aquarium illuminating means 70 detailed in dimensions whereby the illuminating means can be moved to a forwardly adjusting position to permit readily access to the aquarium tank means by movement by selective ones of the access lids 63–65 to an open access position. Access to the front portion of the aquarium tank 10 can be obtained by sliding the illuminating means 70 to a rearwardly displaced position, which will permit the access lid 61 to be easily adjusted to an open access position.

The aquarium frame elements have been described hereinabove as constructed of integrally formed plastic material. However, these frame elements could be constructed of conventional metal shock material. Further, the aquarium bottom, sides and end panel can be either constructed of suitable transparent glass or plastic material which would provide the desired rigid supporting characteristics. The aquarium top 60 can be constructed of either transparent glass or suitable plastic material. The aquarium illuminating housing 71 can be either constructed of suitable metal shock material or suitable plastic material.

FIRST MODIFICATION OF THE AQUARIUM ADJUSTABLE LIGHT MEANS

Figure 7:
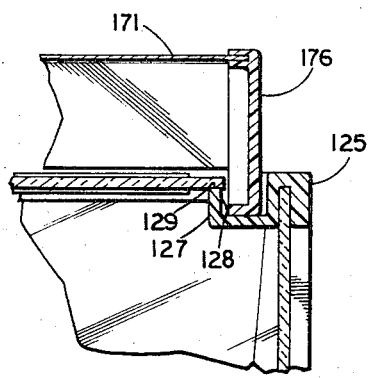
FIG. 7 is a vertical sectional view taken along lines 7—7 of FIG. 6.

As shown in FIGS. 6 and 7, a modified construction of the aquarium adjustable light means includes an alternate top perimeter support element and light housing. The alternate top frame element is generally represented by the reference numeral 121. The top frame element 121 is an integrally formed rectangular construction of plastic material which is identical in horizontal dimensions as the base perimeter element as described hereinabove. The top frame element 121 includes the downwardly directed rectangular groove 122 which receives the upper edges of the aquarium sides 52, 53 and aquarium ends 54, 55. The upper perimeter frame element 121 includes two side frame portions 123 and a pair of end frame portions 125. Each of the side frame portions 123 are provided with inwardly directing supporting ledges 126 and each of the frame portions are provided with an inwardly directed channelshaped supporting ledge 127. The channel-shaped supporting ledges 127 are detailed to define a recessed guide track 128. A light housing 171 having a pair of end frame elements 175, 176 are slidably supported by the channel guide track means 128.

As shown in FIG. 7, the channel guide track means 127 are provided with an upper supporting edge portion 129. Edge portion 129 is detailed for supporting the opposite lateral edges of the transparent top 160. The top 160 is identical in construction to the transparent top 60 described hereinabove in the description of the first embodiment. The vertical dimension of the light housing end frame members 175, 176 is detailed such that the housing 171 is supported in vertically spaced relationship above the transparent top 160. With the transparent top 160 supported upon the upper edge portions 129, the light housing and frame members 175, 176 can be easily adjusted along the guide track means 128 without effecting any vertical displacement of the transparent top 160. The upper supporting edges 129 are in coplanar alignment with the upper edges of the inwardly directing ledges 126, whereby each of the access lids of the transparent top will be supported in a coplanar relationship.

SECOND MODIFICATION OF THE AQUARIUM ASSEMBLY ADJUSTABLE LIGHT MEANS

Figure 8:
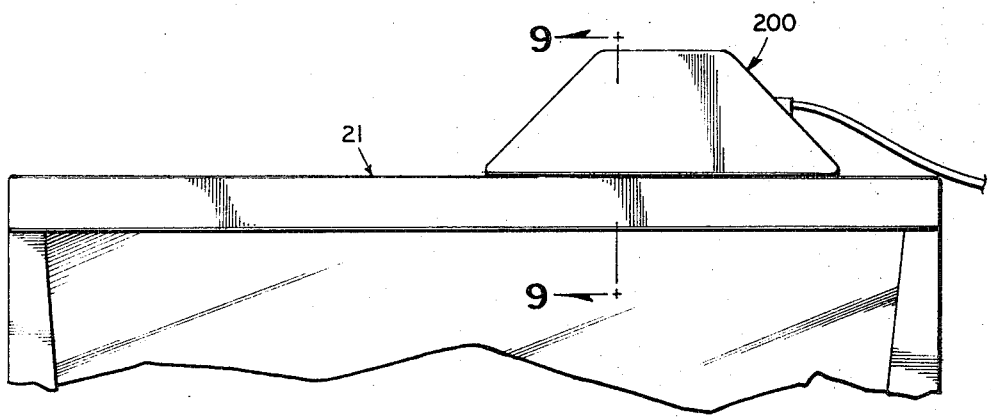
FIG. 8 is end elevational view of a second modification of the light housing.
Figure 9:
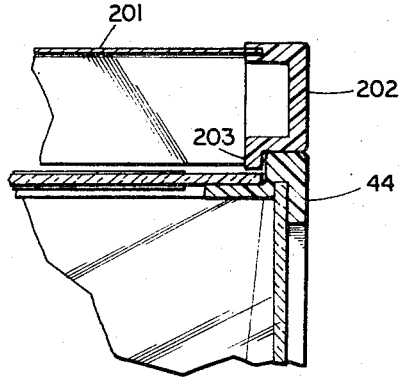
FIG. 9 is a vertical sectional view taken along lines 9—9 of FIG. 8.

Referring now particularly to FIGS. 8 and 9, a second modification of the aquarium assembly adjustable light means is shown and generally represented by the reference numeral 200. The aquarium construction, including the top perimeter frame element is identical to the aquarium construction and top frame element shown in FIGS. 1-5 and corresponding reference numerals are applied to like parts in each of these figures. The adjustable light means 200 shown in FIGS. 8 and 9 includes an elongated housing 201 having end frame members 202 (only one of which has been shown in the drawings). The housing 201 and end frame members 202 are detailed in dimensions such that the end frame members 202 are supported in contact with the upper surface of the upper perimeter end frame portion 43, 44. The light means 200 is maintained in position on the end frame portions 43, 44 by downwardly extending flanges 203 which are integrally formed with the end frame members 202. As shown in FIG. 9, the downwardly extending flanges 203 are supported in guiding engagement with the internal surfaces of the end frame portions 43, 44.

The dimensions of the housing 201 and end plate members 202 are detailed such that the outer surfaces of the end plate members 202 are substantially aligned or coplanar with the outer surfaces of the end frame portions 43, 44. The downwardly projecting guiding flanges 203 are detailed to be vertically spaced slightly above the transparent top side edges, whereby the light housing 200 can be easily adjusted back and forth over the aquarium tank without engaging or disturbing in any way the transparent top 60.

As shown in FIG. 9, the plastic hinge means 66, 67 which are used for interconnecting access lids to the central portion do not extend completely to the lateral side edges of the top, whereby the hinges will not be supported by the laterally extending flanges 46, 47 provided on the upper perimeter frame element 21.

The above described modifications of the aquarium assembly light housing and support means will permit the light housing to be easily adjusted relative to the aquarium tank without effecting any vertical displacement of the aquarium top during the adjustment of the light housing.

It now becomes apparent that the above described illustrative embodiments of an aquarium tank assembly embodying the principles of the present invention is capable of obtaining the above stated objects and advantages. It is obvious that those skilled in the art may make modifications in the details of construction without departing from the spirit of the invention which is to be limited only by the scope of the appended claims.

What is claimed is:

1. An aquarium construction comprising, in combination:
   a. aquarium tank means, said aquarium tank means including a base frame element, a top frame element connected to said base frame element by a number of vertically extending strut members, and wherein said aquarium tank includes a bottom supported by said base frame element and upright wall means supported by said frame element, said top frame element and said vertically oriented struts, and wherein said aquarium tank includes a transparent top member supported thereon; and
   b. light means supported on said aquarium, said light means being operative for producing a lighting effect within said aquarium tank, and wherein said light means is horizontally adjustable relative to said aquarium tank for altering the light effect produced within said tank, c. said top member including a number of sections, said sections being individually movable between closed aquarium covering position and an aquarium access position;

d. said aquarium tank top frame element including a horizontal supporting surface, said light means being slidably mounted on said horizontal supporting surface for effecting said horizontal adjustment relative to said aquarium tank, e. said aquarium top being supported on said top frame element horizontal supporting surface, and said light means being adjustable horizontally relative to said aquarium top; and f. said light means including an elongated light housing having a pair of end members, said housing being so dimensioned that said end members are supported for sliding movement on said top frame horizontal supporting surface, said end members including inwardly directed notches, with opposite side edges of said aquarium top being slidably received within said notches, whereby said light means is adjustable relative to said aquarium top frame element and said aquarium transparent top means.

2. An aquarium construction comprising, in combination:

a. a rectangular base frame element having a horizontal upper supporting surface and a vertical retaining surface, said rectangular base frame element including a number of spaced transversely and longitudinally disposed upwardly directed recesses formed in the horizontal surface of said base frame element and spaced from and adjacent each of the corners of the base frame element, said upwardly directed recesses being of prescribed shapes;

b. a rectangular top frame element having upper and lower horizontal supporting surfaces and a vertical retaining surface, said top frame element including a number of spaced transversely and longitudinally disposed downwardly directed recesses formed in the horizontal surface of said top frame element and spaced from and adjacent each of its corners said downwardly directed recesses being of prescribed shapes;

c. means for connecting said rectangular frame element in vertically spaced relationship above said base frame element, said means for connecting said top frame element to said base frame element including four corner support struts, and wherein each of said struts includes a number of integrally spaced downwardly extending projections smaller than and extending from the lower ends of said struts and a number of integrally spaced upwardly extending projections extending from the upper ends of said struts, said downwardly and said upwardly extending projections having dimensions and being in number complimentary to and respectively received in the upwardly and the downwardly directed recesses of the base frame element and top frame element, and wherein said base frame element and said top frame element are connected to each other in an assembled relationship with said downwardly extending projections projecting into said upwardly directed recesses to the extent that said lower ends of said struts abut the upper surface of said bottom frame element and with said upwardly extending projections projecting into said downwardly directed recesses to the extent that said upper ends of said struts abut the lower surface of said top frame element;

d. bottom and wall means operatively supported by said base frame element, said top frame element and said strut element to define an upwardly open cavity; and e. a top cover means removably carried by the upper horizontal surface of said top frame element.

3. An aquarium construction as required by claim 2 further characterized in that said aquarium includes light means slidably receiving said top means and slidably supported on said aquarium top frame element horizontal supporting surface, and wherein said light means includes reflector means for directing said light downwardly through said light transmitting top to produce lighting effects inside said upwardly opened cavity area.

4. An aquarium construction, comprising:

a. side walls and a bottom assembled together to provide an upwardly opening cavity;

b. a top frame element receiving the upper edges of said side walls, said top frame element having a horizontal supporting surface projecting inwardly and spaced downwardly from the top edge of said top frame element;

c. strut members at the corners of said sidewalls;

d. a light transmitting aquarium top means on said top frame element horizontally supporting surface; and e. light means includes an elongated support housing having a pair of end supporting frame elements, said end supporting frame elements being slidably supported by said horizontal supporting surface between said horizontal supporting surface and said edges of said top, said end supporting frame elements include inwardly directed notches for receiving opposite side edges of said aquarium top, whereby said housing is slidably supported on said horizontal supporting surface for adjustment relative to said top and said top frame element.

5. An aquarium construction, comprising:

a. side walls and a bottom assembled together to provide an upwardly opening cavity;

b. a top frame element receiving the upper edges of said side walls, said top frame element having a horizontal supporting surface projecting inwardly and spaced downwardly from the top edge of said top frame element;

c. strut members at the corners of said sidewalls; and d. a light transmitting aquarium top means supported on said horizontal supporting surface, said top means comprising: a flat cover portion having opposite ends and opposite edges and supported by its ends, by opposite portions of said horizontal supporting surface, hinge means secured to one of said edges of said cover portion, an access lid carried by its edge by said hinge means and adapted to be received by its other edge on said horizontal supporting surface in its closed position and being pivotable upwardly about said hinge means to an open position, and including a light means having a pair of opposed end supporting frame elements, said end supporting frame elements having inwardly opening notches slidably receiving said opposite ends of said top means, said end supporting elements being slidably received on said horizontal supporting surface.

* * * * *